Nov. 27, 1956  J. W. BATCHELDER  2,771,799
THREAD ROLLING TOOL
Filed Dec. 28, 1953  5 Sheets-Sheet 1

INVENTOR.
JAMES W. BATCHELDER
BY
Albert R. Golrick
ATT'Y.

Nov. 27, 1956

J. W. BATCHELDER 2,771,799

THREAD ROLLING TOOL

Filed Dec. 28, 1953

INVENTOR.
JAMES W. BATCHELDER

BY Albert R. Golrick

ATTY.

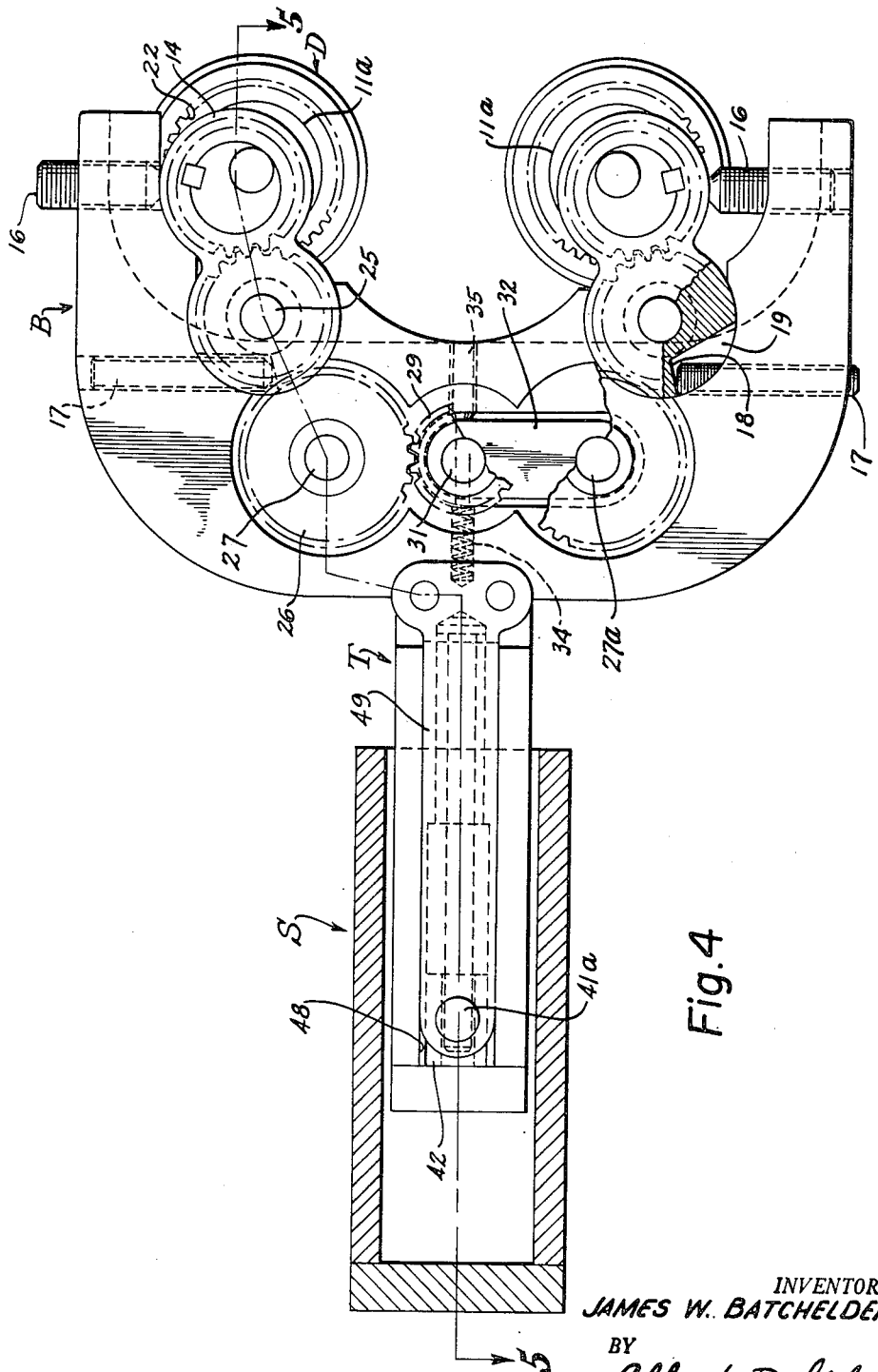

Nov. 27, 1956 J. W. BATCHELDER 2,771,799
THREAD ROLLING TOOL
Filed Dec. 28, 1953 5 Sheets-Sheet 5

INVENTOR.
JAMES W. BATCHELDER
BY Albert R. Golrick
ATT'Y.

United States Patent Office 2,771,799
Patented Nov. 27, 1956

2,771,799

THREAD ROLLING TOOL

James W. Batchelder, Ascutney, Vt.

Application December 28, 1953, Serial No. 400,424

16 Claims. (Cl. 80—6)

The present invention relates to improvements in a tool for die forming the surface of a rotating work piece, and more particularly to improvements in a thread rolling tool for use on an automatic screw machine and the like wherein a work piece is rotated. Though adapted for use in producing other surface formations, this invention will be described as embodied in a thread rolling tool having particular advantages over prior tools.

Automatic screw machines are often used for the production of articles which, in finished form, include threaded surfaces, in such location or of such character that end-working tools such as thread cutting chasers or end-working thread rolling die heads cannot be used to produce them. To avoid the obvious disadvantages involved in transferring work from an automatic machine to another special machine for producing such threads, side-working tools for use in automatic machines have been proposed for approaching the work surface to be threaded from a direction at right angles to the rotating work piece axis, which comprised a frame fixed in a tool holding slide and a pair of thread rolling dies rotatable in the frame. Hitherto tools of this character have had the axes of the dies parallel and at an operatively fixed spacing determinative of the pitch diameter of the thread rolled on the work piece, penetration of the dies into the work piece being secured by the radial feed of the tool relative to the work. Generally with such tools, due to the fact that the points of initial work contact of the dies would occur to the same side of a work diameter perpendicular to line of tool feed, large bending forces were developed transverse to the work axis as die penetration of the work was effected, with consequent frequent damage to the work.

Attempts have been made to overcome this bending effect by providing for a differential in the surface speed of the two dies whereby the tool tends to "climb" onto the rotating work. To this end some tools have used dies of equal diameters connected by gearing which provides a difference in die surface speeds, or with one-to-one gearing, have used dies of different diameter. Since these tools have been dependent in intended operation upon the friction at the areas of die-to-work contact, their design required a careful choice of the angular disposition, relative to the work axis, of the initial points of work contact so that the frictional forces developed would be sufficient to assure that the die would climb onto the contemplated work. Moreover, the rate at which the tool climbed the work had to correlate closely with the number of work turns by which full thread depth penetration was attained. Further, since the angle between the radii of the work piece to the points of contact would change necessarily, special camming mechanism was required in the automatic machines to maintain the proper relationship between the die surface speed differential and the radial in-feed of the tool to avoid stresses in the tool tending to break the die threads. Also, to avoid a similar die thread damage, upon attaining the end of the tool in-feed stroke it was required that the tool then be immediately withdrawn from the work. A further disadvantage of such tools resided in the fact that the gearing between the dies was subjected to considerable stresses arising from the "climb on" effort involved in operation.

The present tool is adapted to a radial feed with respect to the work, the dies being open to clear the work until a time when they straddle the work with the plane of the axes of the dies substantially coincident with the work piece axis, the dies then being radially closed upon the work with substantially opposed motions. Hence no differential in die surface speeds is required to make the tool climb the work and the dies may dwell on the finished thread without damage; no harmful work bending forces are developed, and no special camming mechanisms are required for actuation of the tool carrying slide of the machine in the tool in-feed direction.

An object of the present invention is to provide a side-working tool, having surface forming elements which are closed relative to each other upon a rotating work piece after the tool has been moved into operating position relative to the work. Another object is the provision of a thread rolling tool and the like for automatic screw machines adapted to work behind shoulders or other locations inaccessible to end-working tools. Another object is the provision of a side-working tool which requires simple camming devices in the tool feed mechanisms. Another object is the provision of a side-working tool of the character described wherein rolling die penetration of a rotating work piece is effected through substantially opposed radial movement of such dies.

Other objects and advantages of this invention will appear from the following description and the drawings wherein—

Fig. 4 is a side view of the tool of Fig. 1, with certain parts removed or broken away and others shown in section;

Figure 1:
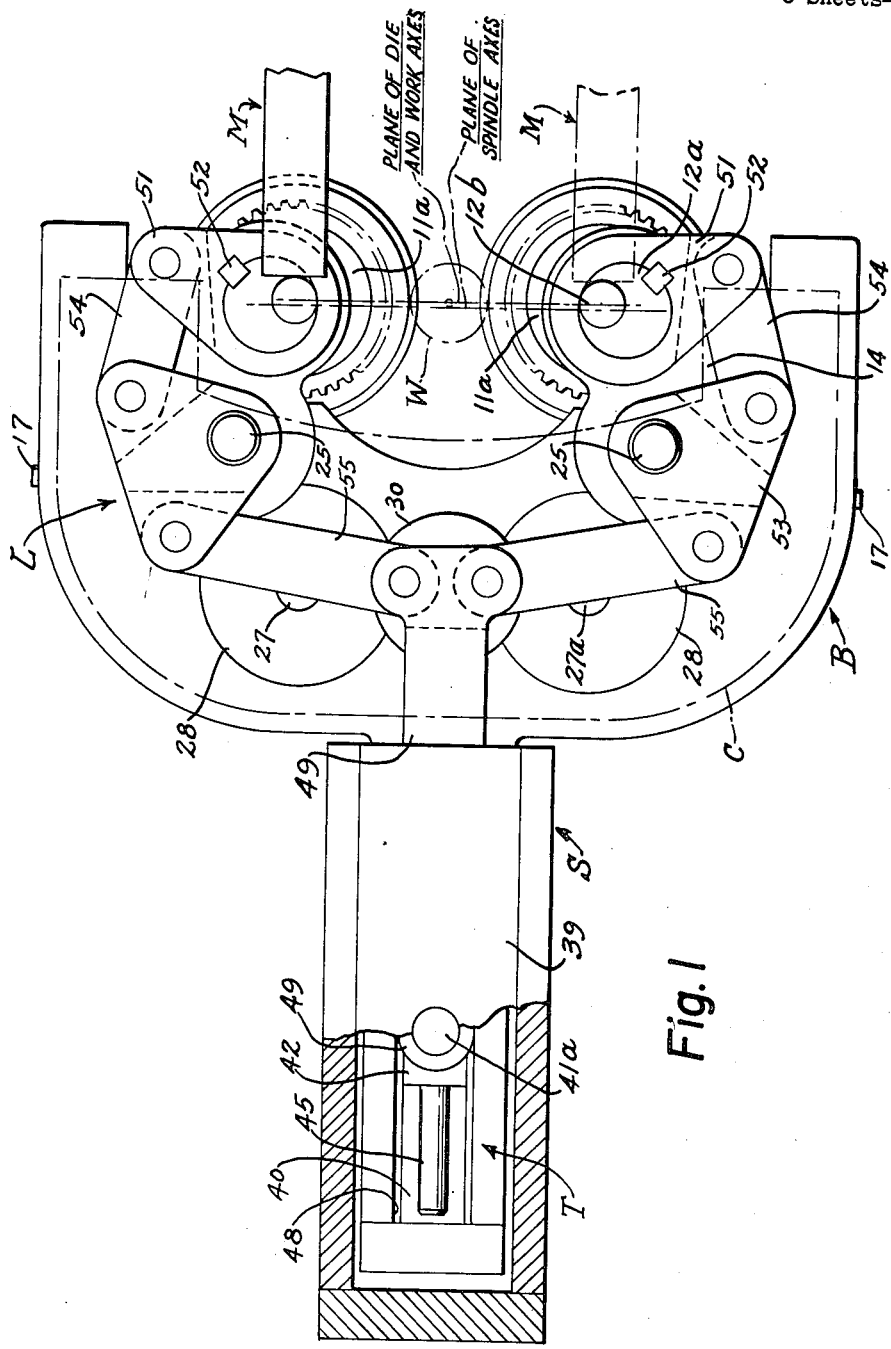
Fig. 1 is a side view of the tool of this invention with the components in operative die closed position for rolling a thread.

In the drawings the tool of this invention is shown as comprised, as principal components, of a hollow box-like shank S whereby the tool is mounted on or to the tool slide say of an automatic machine for advancement toward or away from a work piece, a body or frame B with an integral tang T slidingly and telescopingly received in the shank S, a pair of like thread rolling dies D, a gearing train G for maintaining the dies in proper thread rolling phase relationship and a toggle and lever system L on one side of the body for moving the dies into and away from thread rolling engagement with the work; while in dashed outline appear stop means M on the bed of the machine cooperating in closing the dies upon the work; a work piece W rotated about a horizontal axis by a spindle of a machine in which this tool is used, and a cover plate C for the toggle and link system L. In general structure the two forms of the invention are quite similar and hence corresponding elements will be referred to by similar reference numerals.

The frame or body B, which may be identical for the two forms of the device, is shown as generally symmetrical about a horizontal longitudinal plane, being roughly C-shaped with the end face of the body opposite the tang T recessed and undercut to provide a work receiving space and to provide a space for swingably mounting the dies D within the legs of the C-shaped body. Each die D is journalled on an eccentric portion 11a of a die supporting spindle 11 with trunnion portions 12 and 12a rotatably supported in a pair of parallel rocker arms 13 and 14 mounted at opposite sides of a leg of the die body. Each rocker arm has a base end portion constituting the major portion of a cylindrical periphery pivotally mounted in a recess bored at and intersecting the internal margin of the body leg. To hold each rocker arm in the body and in selected adjusted position there is provided a corresponding pair of screws 16 and 17 threaded through the leg, the coarse set screw 16 bearing laterally against the free end of the rocker arm and a tangent set screw 17, opposed in action to screw 16, bearing against a shoulder 18 provided by a radial slot 19 cut edgewise into the pivot end of the rocker arm.

Each die is provided with a skirt portion 21 carrying an internal gear 22 concentric or coaxial with the die journal bore. The gearing train G comprises gears 23 journalled on the trunnion portion 12a of each spindle between the eccentric portion 11a and the rocker arm 14 to mesh with gears 22 and second gears 24 in recesses bored in the inner face of the pivot base portion of rocker arms 14, gears 24 being journalled on pins or shafts 25 extending through and coaxially of the rocker arm pivot bases; third gears 26 meshed with gears 24 and journalled within frame recesses on shafts 27 and 27a supported endwise in the body and in recess cover plugs 28, while a common fourth, or central gear 29 is meshed with the two gears 26 to close the train. As may be more clearly seen in Figs. 4 and 6, this gear, likewise located in a recess of the body and covered by a plug 30, is journalled on a shaft 31 carried by an arm 32 pivotally mounted on the inner end of the lower shaft 27a in a recess below the level of the gear train. The two sides of the gear train are identical in the gears and their locations.

Figure 6:
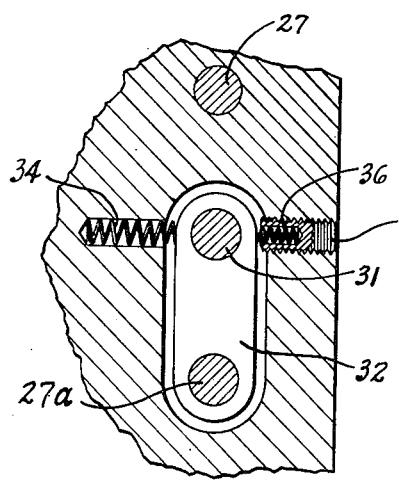
Fig. 6 is a detail of the mounting for the central gear of the die gearing train including a modification of that in Fig. 4.
Figure 5:
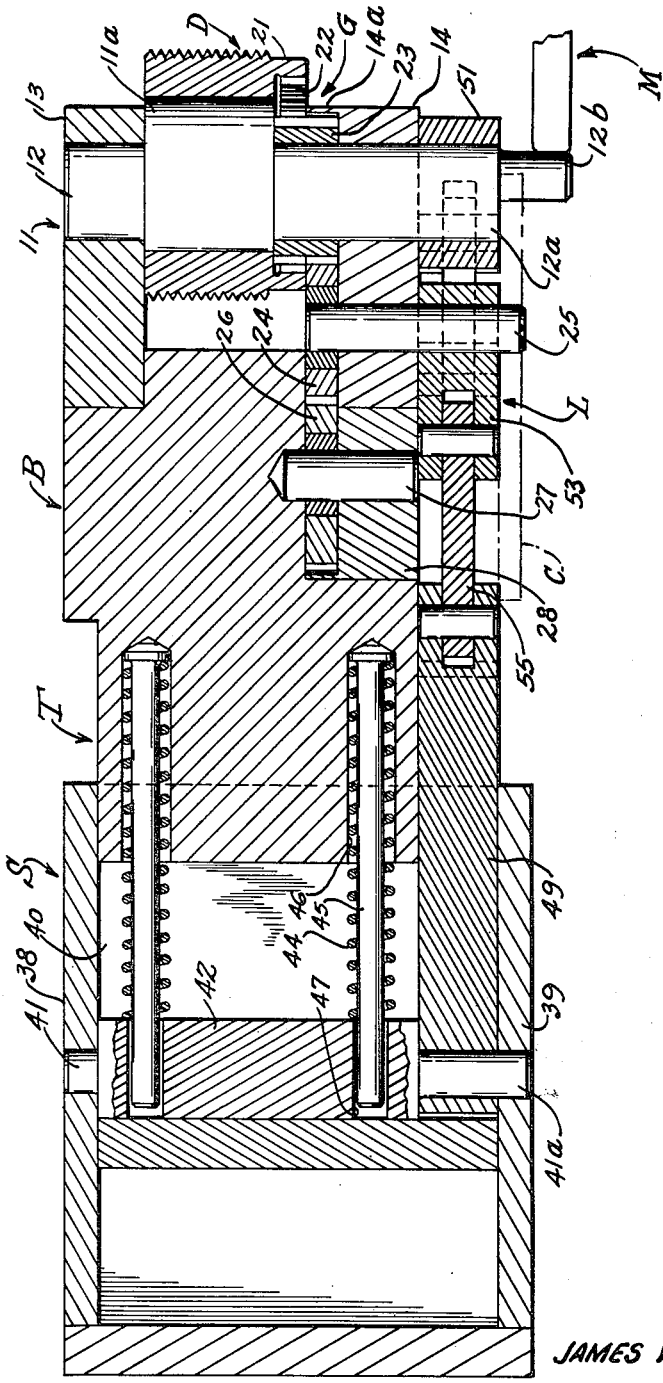
Fig. 5 is a sectional view of the tool of Fig. 1 but with the dies open, the section being taken substantially along a line such as 5—5 in Fig. 4.

The normal position of the arm 32 is determined by a compression spring 34 and a set screw 35 bearing on opposite sides of the free end of the arm, but the set screw 35 may, as shown in Fig. 6, have a recessed end carrying a second compression spring 36 to bear directly on the arm whereby, if desired, the arm is permitted to swing in either direction from a set normal position.

To protect the gear train as far as possible and also to position and space the inner end of the rocker arm from the underlying body, the inner face of each rocker arm 14 may be bored to leave an interrupted shroud flange 14a partially enclosing the adjacent gears. Similarly, to space the plugs relative to the body, they may be formed with flanges or shrouds interrupted to permit the meshing of the gears, while the underside of central plug 30 has an elongated recess to accommodate the outwardly projecting end of the movable central gear shaft 31.

The box shank S is of rectangular cross section to receive in telescoping fashion the tang T of the tool body. As here shown, it is comprised of top, bottom, and side plates brazed together into an integral structure with ends 41, 41a of a horizontal trunnion bar 42 journalled in side plates 38 and 39 at the center of the box. The tang T is longitudinally horizontally slotted at 40 to receive the rectangular body portion of the trunnion bar, the end of the tang being closed by a plate secured thereto to provide a stop against the trunnion bar limiting outward motion of the tool body. To bias the tool body outwardly of the shank S, paired compression springs 44 are operatively disposed in the tang slot between the tool body and the tunnion bar 42. These springs are supported on headed guide pins 45 with heads received in bores 46 extending inwardly from the end of the tang slot and free ends slidably received in transverse bores 47 in the trunnion bar.

The structure thus far described is similar for the two forms of the invention. The side face of the tang in Fig. 1 is provided with a longitudinal groove 48 wider than tang slot 40, forming a slideway for a toggle center bar or link 49, one end of which is pivoted on the trunnion bar end 41a. In the form of the invention shown in Fig. 2, the outer end of groove 48a has flaring or outwardly diverging sides to accommodate certain elements of the toggle system and lateral operational swing thereof.

In the form of the invention shown in Fig. 1, the eccentrics 11a of the die spindles are so disposed that the plane including the parallel die axes, therefore the plane of the parallel axes of the spindle eccentric portions, is parallel to the plane of the parallel axes of the die spindles, or more specifically, of the die spindle trunnion portions, the dies being closed into proper thread rolling position by rotation of the spindles in opposite sense. The actuating mechanism, that is the toggle and linkage system whereby the die spindles are simultaneously rotated, comprises for each die spindle a lever arm 51 held on the end of the trunnion portion 12a outward of the rocker arm 14 by a key 52, a bell crank 53 pivotally mounted on the projecting outer end of the pin 25 of the second gear, a link 54 with ends secured by pivot pins within edgewise slots of the bell crank and the lever arm, and a second link 55 similarly secured by pivot pins to a second corner of the bell crank and to the end of the center bar or link 49, the two links 55 and center bar 49 forming a toggle joint. The length between pivot centers of the link 54 is equal to the spacing of the axes of the spindle trunnion and the corresponding shaft 25 about which the bell crank pivots, and likewise the distances between the axes of the pivot centers of links 54 and the axes of the trunnion and shaft 25 respectively are equal, to form a parallelogram connection between bell cranks and lever arms.

In the linkage system L of the first form of the invention, having a symmetrical disposition of elements, there is provided on a trunnion portion 12a of each spindle and eccentric thereto, a cylindrical extension or stop engaging lug 12b, the axis of which is aligned with the axis of the spindle eccentric portion and therefore with the axis of the die. Accordingly there are provided on the automatic machine a pair of stops M positioned relative to the work and to the tool to engage the lugs 12b, as the tool is advanced by a tool holder of the machine radially to the work, at such time when the tool is approximately in position straddling the work.

At the time of engagement the dies are, of course, in open position by action of the biasing springs 44. At this position the eccentric axes, therefore the die and lug axes, are swung out about 40° from the final thread rolling die closed position, or about 45° from the vertical plane of the spindle axes. Thereafter as the tool slide is advanced, the die axes are held by the aforesaid engagement of stops M in a plane passing through the work axis. As the means, comprised of lugs 12b, for engagement with stops M is carried on the frame, the continued advance of the tool slide, and therefore of shank S, effects a relative motion between the frame impeded by stops M and the shank. Hence the center or toggle actuating bar 49 bearing inwardly at the toggle knee straightens the toggle elements 55 to cause a simultaneous equal rotation of the trunnions and eccentrics which swings the dies inwardly to closed thread rolling position. Upon reaching the closed position, the eccentric die and lug axes have been swung inwardly about the spindle axis points about 5° short of coincidence with the plane of the spindle trunnion axes. Since the stops M in this form of the tool are to maintain the die axes in a fixed plane including the work axis, they must of course have lug contact surfaces parallel to the plane of the spindle axes of extent corresponding to the inward linear component of die axis excursion during the 40° spindle rotation of die closing.

The dimensions of the tool components are chosen in both tool forms so that the spindle rotation, here 40°, is sufficient not only for the penetration of the work but also for a sufficient operational clearance of the open dies and work during movement of the tool toward and away from the work axis. During advancement of the tool slide and tool by virtue of the time and camming system of the automatic machine, after contact with the stops M the initial rotation of the die spindles swings the dies freely through the said clearance into contact with the work. Thereafter as the work is being penetrated increasing force must be applied to the dies. By the disposition shown in the drawings of the eccentrics, arms 51, bell cranks 53 and links 54, there is formed with the links 55 what is effectively a compound toggle system having elements approaching dead center relations as the dies are closed and hence having increasing mechanical advantage for applying increasing force in penetrating the work. The second form of the invention hereinafter described has a toggle system of like operational advantages. Also in the first form, the effective lever length of the eccentrically located lugs 12b increases during die closing for increased mechanical advantage.

Figure 2:
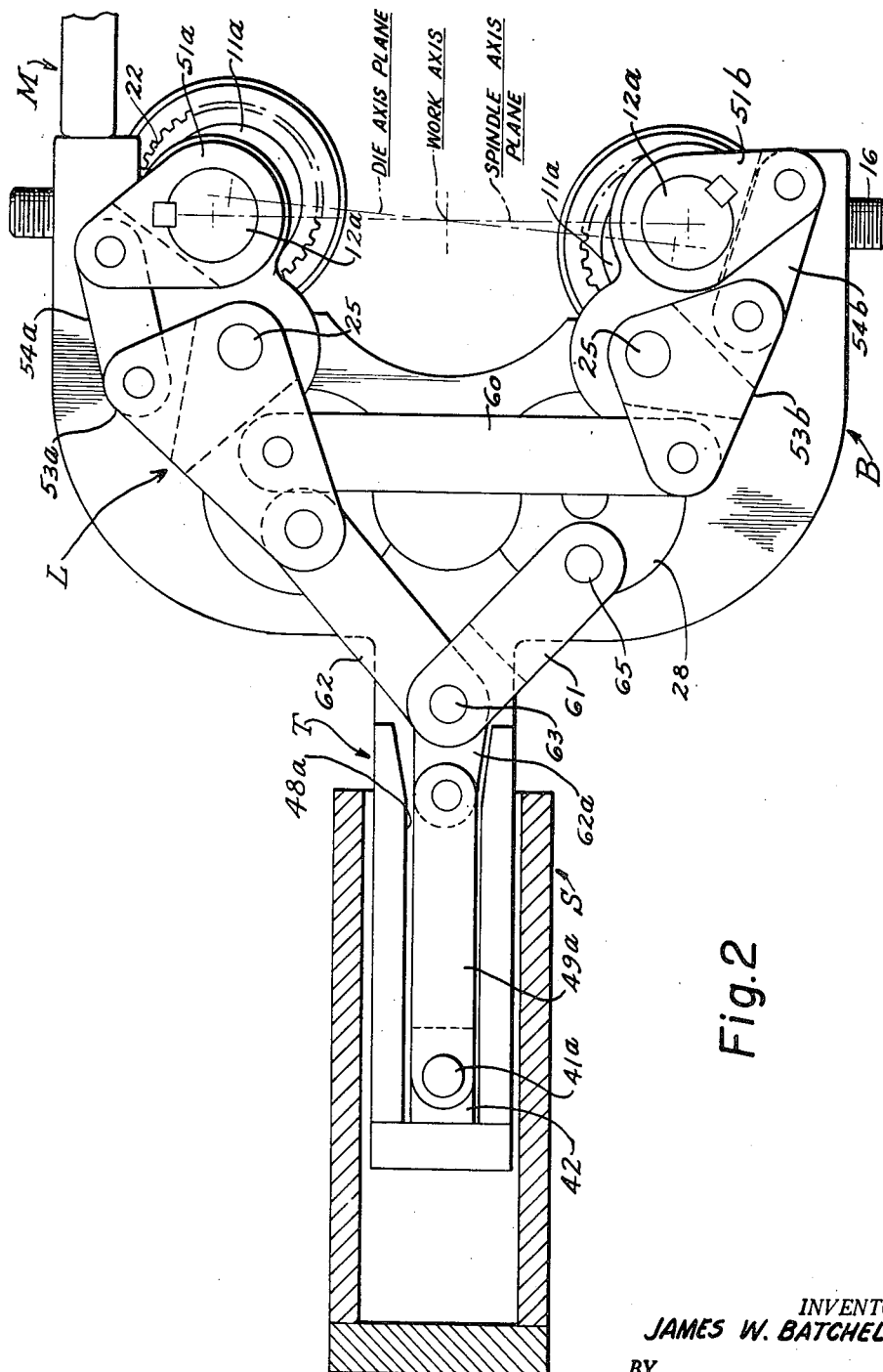
Fig. 2 is a side view of a tool similar to that of Fig. 1 with modified type of toggle and link system for swinging the dies to open or closed position relative to the work, the parts of the device, however, being shown at the die open position.
Figure 3:
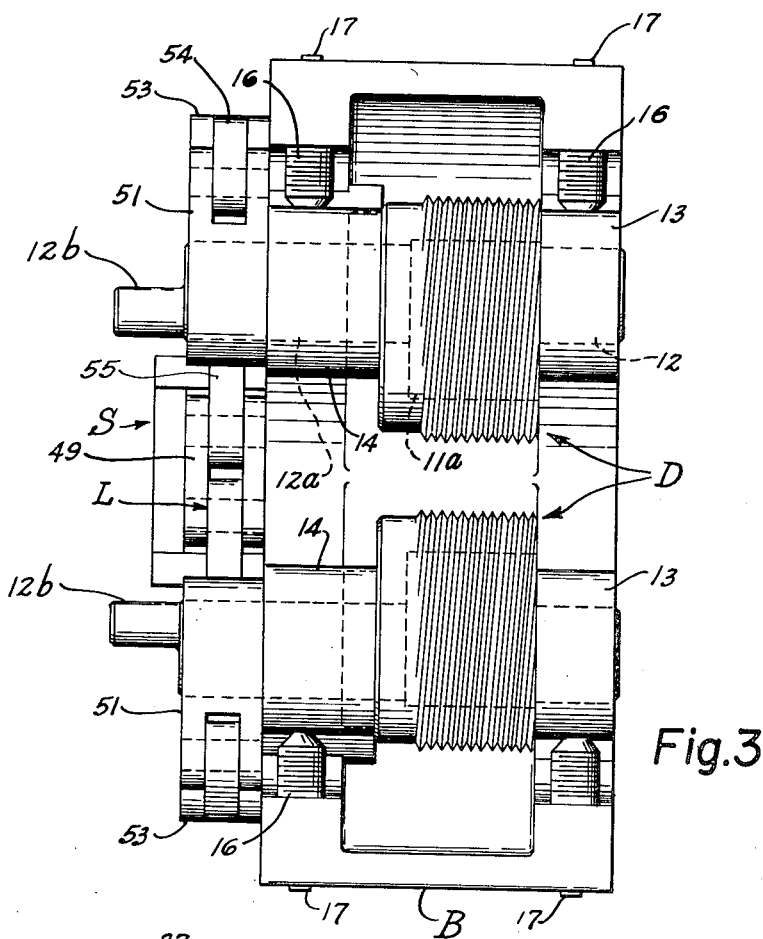
Fig. 3 is an end view of Fig. 1.

In the second and preferred form of the invention shown in Fig. 2 the die body, shank, tang, spring biasing system, phase gearing system, dies and spindles may be identical with the first form except as otherwise herein noted. The toggle and linkage system L, interconnecting the die spindles for simultaneous rotation and for transforming the relative linear motion between the shank and frame into spindle rotating movement, here again includes for each spindle the lever arms 51a and 51b respectively for the upper and lower dies which are keyed on the trunnion portions 12a of the spindles. Bell crank members 53a and 53b pivoted on the ends of second gear shaft 25 and links 54a, 54b connecting the corresponding lever arms and bell cranks are in a parallelogram arrangement similar to that described for Fig. 1, while a cross link 60 has its ends held in edgewise slots in the remaining ends of the bell cranks by pivot pins which are correspondingly located relative to the axes of the shafts 25 and the pivots of links 54a, 54b. The toggle center bar or actuating bar 49a is tied to the foregoing elements through the linkage comprised of the links 61 and 62 pivotally joined by pin 63 to form a toggle joint with its knee connected to bar 49a by the oblique extension 62a of link 62, the end of link 61 being pivoted to the body by pin 65 in lower recess plug 28 while the end of the link 62 is pivotally pinned to the bell crank 53a. The groove 48a does not here form a slideway for center or actuating bar 49a since lateral clearance must be provided to permit some swing in operation.

A cover plate secured to the tool body by suitable fasteners may be used to protect the actuating mechanism on either of the tools. Such plate may advantageously serve as an outboard support for the outer ends of shafts 25 and, in the second tool, also of pivot pin 65.

With the linkage system of Fig. 2, since the spindles are rotated in the same sense in closing the dies, the eccentric axes are rotationally positioned in analagous positions on opposite sides of the plane including the spindle axes. However, as in the first form the spindles are set so that with about a 40° spindle rotation the eccentric and die axes are swung to positions about 5° short of the plane of the spindle axes. The plane including the position of the eccentric axes, hence die axes, when closed by the linkage system, intersects the plane of the spindle axes in a line of intersection which, by setting of the tool and stop M, substantially coincides with the rotational axis of a work piece to be threaded. At least one of the legs of the C-shaped frame or body is of such form as to provide an abutment surface suitable as means for engagement with the fixed adjustable stop M whereby the frame is impeded after advancement by the tool slide or holder to a position where the aforesaid line of intersection is coincident with the work axis.

In both forms of the invention, an accurate sliding fit is preferred between the shank side plates 38 and 39 and the adjacent tang surfaces to keep the frame and hence spindle axes from canting out of required position. However some vertical clearance between tang and shank has the advantage that the tool frame may pivot about the axis of the trunnion bar 42 to permit self-equalization of the rolling load between the dies on opposite sides of the work.

Also in both disclosed tools, in addition to rough adjustment of die phase relation by changing the meshing of the gear teeth, a fine adjustment may be made through set screw 35 which controls the normal position of the axis of the central gear 29. However, due to the fact that there would be a slight difference in rotational die speeds developed in consequence of the horizontal components of the eccentric swing during die closing in the first tool if the axis of central gear 29 were fixed, there is particular need for the yieldable mounting of gear 29 in the first tool.

The dies may be helically threaded dies of form known to the art for rolling threads with die axes parallel. Since there is no need for a difference in die surface speeds to bring the dies cleanly onto the work, the phase gearing serves only to ensure tracking of the dies on the work thread rolled, and need not carry additional and heavy loads such as those usually involved where a differential in die surface speed is required. Also, as the tracking is secured by the gearing train alone, the disadvantages and operational uncertainties of axially floating dies are entirely avoided. Moreover, the tool is useful with other dies such as those used for knurling or forming lubrication spirals or grooves, and has advantages in the mechanism for bringing the dies into work rolling penetrating relationship even where die tracking or phase gearing is not necessary.

Experience has shown that the forces involved in thread rolling deflect a die spindle sufficiently to cause galling, scoring or other die or spindle life shortening wear at opposite ends of the die bore due to bearing loads there concentrated by the deflection. Hence it is preferred that the die bore be somewhat flared or bell mouthed with a cylindrical spindle surface or that the die journalling surface of the spindle be somewhat barrel-shaped with a cylindrical die bore to compensate in some degree for the deflection expected in given rolling operation. Thus the bearing load may be distributed more evenly along the axial extent of the bearing surfaces.

By means of the coarse adjusting screws 16 which bear the heavy die spreading stresses of rolling operations and the fine thread tangent screws 17 which are adapted for close setting of the die positions, the rocker arms may be varied and locked in place as required for the accommodation of different sizes of work. More exactly stated, where thread rolling is involved, the arms may be located so that the dies when in closed position will be spaced in accordance with the pitch diameter of the thread to be rolled. In Fig. 4 with dies in open position, by way of example, the range of arm and die adjustment is clearly shown, the top and bottom dies being respectively in outermost and innermost open positions. The parallelogram arrangement previously described for both forms of the tool permits such wide range of arm and die adjustment without change of the angular relationship of the closed and open position of a die axis with respect to the vertical plane through its spindle trunnion axis.

Both tools, it should be noted, may be used with the horizontal center plane thereof above or below the work axis by corresponding asymmetric location of the rocker arms and spindle axes. The parallelogram arrangement of the bell crank and spindle lever arm linkages permits such arrangement without changing the open and closed positions of the eccentric axes with respect to their spindle axes. In such case two stops M should also be used with the second form of the tool to avoid pivoting of the tool about a single stop.

I claim:

1. A side working surface rolling tool adapted for use in a metal working machine having a work piece rotating means, a tool holder for advancing a tool radially to a work piece, and tool actuating fixed stop means, comprising: a shank adapted to be held in said tool holder; a rigid tool frame slideably mounted to said shank; resilient means operatively disposed between said shank and frame to bias the frame in one direction relative to the shank; a pair of opposed dies for roll forming the surface of a rotating work piece; means mounting the dies to said frame including rotatable spindles each having an eccentric whereon one of said dies is journalled whereby said dies are closed and opened relative to each other by spindle rotation; means on said frame to engage said stop means during tool holder advancement to effect relative motion between said shank and frame; and a mechanism on the frame connecting said spindles for simultaneous rotation of one with the other, the said mechanism including a motion converting connection to said shank whereby said relative motion rotates said spindles to close said dies.

2. A side working surface rolling tool adapted for use in a metal working machine having a work piece rotating means, a tool holder for advancing a tool radially to a work piece, and tool actuating fixed stop means, comprising: a shank to be held in said tool holder; a rigid tool frame slideably mounted to said shank; resilient means operatively disposed between said shank and frame to bias the frame in one direction relative to the shank; a pair of opposed dies for roll forming the surface of a rotating work piece; means mounting the dies to said frame including rotatable spindles each having an eccentric whereon one of said dies is journalled whereby said dies are closed and opened relative to each other by spindle rotation; means on said frame to engage said stop means during tool holder advancement to effect relative motion between said shank and frame; and a mechanism on the frame connecting the spindles to each other and to said shank whereby said relative motion closes said dies, said mechanism including for each spindle a lever arm secured to the spindle and a bell crank member pivoted to said frame with a link having ends pivoted respectively to one side of the bell crank and to said lever arm, and a toggle type linkage connecting the bell cranks having the center bar thereof secured to said shank.

3. A side working surface rolling tool adapted for use in a metal working machine having a work piece rotating means, a tool holder for advancing a tool radially to a work piece, and tool actuating fixed stop means, comprising: a shank adapted to be held in said tool holder; a rigid tool frame slideably mounted to said shank; resilient means operatively disposed between said shank and frame to bias the frame in one direction relative to the shank; a pair of opposed dies for roll forming the surface of a rotating work piece; means mounting the dies to said frame including rotatable spindles each having an eccentric whereon one of said dies is journalled for rocking said dies to closed and opened positions relative to each other by spindle rotation, paired spindle journalling arm members for each spindle extending from and pivoted to said frame for varying the spindle spacing and locations, and means to hold the arm members at selected location; means on said frame to engage said stop means during tool holder advancement to effect relative motion of said shank and frame; and a mechanism on the frame connecting the spindles to each other and to said shank whereby said relative motion closes said dies said mechanism including for each spindle a lever arm secured to the spindle and a bell crank member pivoted coaxially with a corresponding arm member to said frame with a link having ends pivoted respectively to one side of the bell crank and to said lever arm, and a toggle type linkage connecting the bell cranks having a center bar thereof secured to said shank, the lever lengths from the bell crank pivot axis and spindle axis to said link being equal and parallel thereby to permit variation of spindle location while maintaining a set angular disposition of the eccentric axis relative to the plane of the spindle axes for die open position.

4. A tool as described in claim 3 wherein the said mechanism includes a cross link with ends pivoted to said bell cranks, and a toggle joint with one end pivoted to the frame and the other end pivoted to one of said bell cranks, said center bar being connected to the knee of said toggle joint.

5. A tool as described in claim 3 wherein the said mechanism includes a toggle joint with ends pivoted to said bell cranks and a center bar with one end pivoted to said shank and the other pivoted at the knee of said toggle joint, and wherein the said means for engaging the stop means comprises a cylindrical extension on each of said spindles coaxial with said eccentric.

6. A tool as described in claim 3 wherein the said center bar is secured to said shank by a pivot bar with axis parallel to said spindles and wherein said frame is slideably mounted to said shank and pivot bar for limited pivoting about the axis of said pivot bar whereby self-equalization of rolling loads between said dies is attained.

7. A side working surface rolling tool adapted for use in a metal working machine having a work rotating means, a tool holder for advancing a tool radially to a work piece, and tool actuating fixed stop means, comprising: a shank adapted to be held in said tool holder; a rigid tool frame slideably mounted to said shank; resilient means operatively disposed between said shank and frame to bias the frame in one direction relative to the shank; a pair of opposed dies for roll forming the surface of a rotating work piece; means mounting the dies to said frame including rotatable spindles each having an eccentric whereon one of said dies is journalled whereby said dies are closed and opened relative to each other by spindle rotation; means on said frame to engage said stop means during tool holder advancement to effect relative motion of said shank and frame; a mechanism on the frame connecting said spindles for simultaneous rotation of one with the other, the said mechanism including a motion converting connection to said shank whereby said relative motion rotates said spindles to close said dies; and means carried by said frame and spindles for maintaining said dies in predetermined phase relationship while in driven rolling contact with a work piece.

8. A side working surface rolling tool adapted for use in a metal working machine having a work piece rotating means, a tool holder for advancing a tool radially to a work piece, and tool actuating fixed stop means, comprising: a shank adapted to be held in said tool holder; a rigid tool frame slideably mounted to said shank; resilient means operatively disposed between said shank and frame to bias the frame in one direction relative to the shank; a pair of opposed dies for roll forming the surface of a rotating work piece; means mounting the dies to said frame including rotatable spindles each having an eccentric whereon one of said dies is journalled for rocking said dies to closed and opened positions relative to each other by spindle rotation, paired spindle journalling arm members for each spindle extending from and pivoted to said frame for varying the spindle spacing and locations, and means to hold the arm members at selected location; a phase gearing train having an odd number of gears connecting said dies including an internal gear formed coaxially on each die, a first gear for each die journalled on the spindle between the eccentric and an adjacent arm member to mesh with the internal gear, a second gear coaxial with the pivot axis of each said adjacent arm member meshing with the corresponding first gear, and idler gearing carried by the frame connecting the two said second gears; means carried on said frame to engage said stop means during tool holder advancement to effect relative motion of said shank and frame; and a mechanism on the frame connecting the spindles to each other and to said shank member whereby said relative motion closes said dies, said mechanism including for each spindle a lever arm secured to the spindle and a bell crank member pivoted coaxially with the corresponding arms to said frame with a link having ends pivoted respectively to one side of the bell crank and to said lever arm, and a toggle type linkage connected between the bell cranks and said shank and having the actuating center bar thereof secured to said shank.

9. A tool as described in claim 8 wherein the gearing means connecting said second gears includes an idler pinion yieldably mounted to said frame to permit limited shifting in a direction transverse to its axis.

10. A side working thread rolling tool adapted for use in a metal working machine having work piece rotating means, a tool holder for advancing a tool radially to a work piece, and tool actuating stop means, comprising: a shank adapted to be held in said tool holder; a rigid tool frame slideably mounted to said shank; biasing means operatively disposed between said shank and frame to bias the frame in one direction relative to the shank; a pair of opposed rotary threading dies for producing a threaded formation on the surface of a rotating work piece; means mounting the dies to said frame including rotatable spindles each having an eccentric whereon a corresponding one of said dies is journalled whereby said dies are closed and opened relative to each other upon corresponding spindle rotation; means carried on said frame for engagement with said stop means during tool holder advancement to effect relative motion of said shank and frame in opposition to said biasing means; and a mechanism on the frame connecting the spindles to each other for simultaneous rotation including a motion converting connecting to said shank whereby said relative motion is effective to close said dies.

11. A side working thread rolling tool adapted for use in a metal working machine having work piece rotating means, a tool holder for advancing a tool radially to a work piece, and tool actuating stop means, comprising: a shank adapted to be held in said tool holder; a rigid tool frame slideably mounted to said shank; resilient means operatively disposed between said shank and frame to bias the frame in one direction relative to the shank; a pair of opposed dies having helical threads thereon for producing a threaded formation on the surface of a rotating work piece; means mounting the dies to said frame including rotatable spindles each having an eccentric whereon a corresponding one of said dies is journalled whereby said dies are closed and opened relative to each other and to a work piece therebetween upon corresponding spindle rotation; means carried on said frame to engage said stop means during tool holder advancement to effect relative motion of said said shank and frame in opposition to said resilient means; a mechanism on the frame connecting the spindles to each other for simultaneous rotation, said mechanism including a toggle type motion converting connection to said shank whereby said relative motion is effective to close said dies; and a gearing train mounted to said frame connecting said dies in thread rolling phase relation.

12. A side working thread rolling tool adapted for use in a metal working machine having work piece rotating means, a tool holder for advancing a tool radially to a work piece, and tool actuating stop means, comprising: a shank adapted to be held in said tool holder; a rigid tool frame slideably mounted to said shank; resilient means operatively disposed between said shank and frame to bias the frame in one direction relative to the shank; a pair of opposed helical thread rolling dies for producing a threaded formation on the surface of a rotating work piece; means mounting the dies to said frame including rotatable spindles each having an eccentric whereon a corresponding one of said dies is journalled whereby said dies are closed and opened relative to each other upon corresponding spindle rotation, spindle journalling arm means extending from and pivoted to said frame for varying the spindle spacing, and means to hold the arm means at selected location; means carried on said frame to engage said stop means during tool holder advancement to effect relative motion of said shank and frame in opposition to said resilient means; and a mechanism on the frame connecting the spindles to each other for simultaneous rotation including a motion converting connection to said shank whereby said relative motion is effective to close said dies.

13. A side working thread rolling tool adapted for use in a metal working machine having work piece rotating means, a tool holder for advancing a tool radially to a work piece, and tool actuating fixed stop means, comprising: a shank adapted to be held in said tool holder; a rigid tool frame slideably mounted to said shank; biasing means operatively disposed between said shank and frame to bias the frame in one direction relative to the shank; a pair of opposed threading dies for producing a threaded formation on the surface of a rotating work piece; means mounting the dies to said frame including rotatable spindles each having an eccentric portion whereon a corresponding one of said dies is journalled whereby said dies are closed and opened relative to each other upon corresponding spindle rotation, and extended arm means pivoted to said frame mounting said spindles in adjustably spaced relation; phase gearing means connecting said dies in predetermined work piece threading contact relation, including a gear coaxial to the pivot of each said arm means, means connecting said gear and a corresponding die, and intermediate gear means displaceable on the frame connecting the gears and coaxial to the arm means pivot axes; means carried on said frame to engage said stop means during tool holder advancement to effect relative motion of said shank and frame in opposition to said biasing means; and a mechanism on the frame connecting the spindles to each other for simultaneous rotation including a toggle-type motion converting connection to said shank whereby said relative motion is effective to close said dies.

14. A tool as described in claim 13 wherein said mechanism includes for each spindle a lever arm fixed thereto, a second lever arm pivoted to the frame, and a link pivotally connecting said lever arms in parallelogram relation; and a toggle linkage between said second lever arms and said shank.

15. In a metal working machine having work piece holding and rotating means, a tool holder for retracting and advancing a tool relative to a position straddling a work piece in the machine and tool actuating stop means: the combination with said stop means of a work piece surface rolling tool comprising a shank adapted to be held in said tool holder; a rigid tool frame slideably mounted to said shank; biasing means operatively disposed between said shank and frame to bias the frame in one direction relative to the shank; a pair of opposed dies for roll forming the surface of a rotating work piece; means mounting the dies in mutually adjustable spaced relation to said frame and to each other including rotatable spindles each having an eccentric whereon a corresponding one of said dies is journalled whereby said dies are closed and opened relative to each other upon corresponding spindle rotation, said dies at closed position having a predetermined mutual disposition of axes in spaced relation; means carried on said frame for engagement with said stop means during tool holder advancement to effect relative motion of said shank and frame in opposition to said biasing means; and a mechanism on the frame connecting the spindles to each other for simultaneous rotation including a motion converting toggle type connection to said shank whereby said relative motion is effective to close said dies.

16. A side working surface rolling tool adapted for use in a metal working machine having a work piece rotating means, a tool holder for advancing a tool radially to a work piece, and tool actuating fixed stop means, comprising: a shank adapted to be held in said tool holder; a rigid tool frame slideably mounted to said shank; resilient means operatively disposed between said shank and frame to bias the frame in one direction relative to the shank; a pair of opposed dies for roll forming the surface of a rotating work piece; means mounting the dies rotatably to said frame including for at least one of the dies a rotatable spindle having an eccentric whereon the said one of said dies is journalled whereby a relative closing and opening motion is effected between said dies by spindle rotation; means on said frame to engage said stop means during tool holder advancement to effect relative sliding motion of said shank and frame; and a mechanism on the frame connected with said spindle for simultaneous rotation thereof with relative motion of said shank and frame, the said mechanism including a motion converting connection to said shank whereby said relative sliding motion rotates said spindle to effect a die closing motion.

References Cited in the file of this patent

UNITED STATES PATENTS

| | | |
|---|---|---|
| 1,739,939 | Baehr | Dec. 17, 1929 |
| 2,011,761 | Handel | Aug. 20, 1935 |
| 2,436,975 | Ross | Mar. 2, 1948 |
| 2,518,785 | Houk | Aug. 15, 1950 |
| 2,554,166 | Adcock | May 22, 1951 |
| 2,576,709 | Affleck | Nov. 27, 1951 |
| 2,651,224 | Erdelyi | Sept. 8, 1953 |

FOREIGN PATENTS

| | | |
|---|---|---|
| 273,753 | Switzerland | Feb. 28, 1951 |